(12) United States Patent
Liu et al.

(10) Patent No.: US 9,637,394 B2
(45) Date of Patent: May 2, 2017

(54) METHOD OF PREPARING A TIO2 NANOSTRUCTURE

(71) Applicant: Nanyang Technological University, Singapore (SG)

(72) Inventors: Jiehua Liu, Singapore (SG); Xue-Wei Liu, Singapore (SG); Xiangfeng Wei, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 1045 days.

(21) Appl. No.: 13/626,509

(22) Filed: Sep. 25, 2012

(65) Prior Publication Data

US 2013/0084239 A1    Apr. 4, 2013

Related U.S. Application Data

(60) Provisional application No. 61/539,179, filed on Sep. 26, 2011.

(51) Int. Cl.
| | |
|---|---|
| *C01G 23/053* | (2006.01) |
| *C01G 23/00* | (2006.01) |
| *H01M 4/485* | (2010.01) |
| *H01M 4/48* | (2010.01) |
| *B82Y 40/00* | (2011.01) |

(52) U.S. Cl.
CPC ......... *C01G 23/053* (2013.01); *C01G 23/005* (2013.01); *H01M 4/48* (2013.01); *H01M 4/485* (2013.01); *B82Y 40/00* (2013.01); *C01P 2002/22* (2013.01); *C01P 2002/72* (2013.01); *C01P 2002/82* (2013.01); *C01P 2002/88* (2013.01); *C01P 2004/04* (2013.01); *C01P 2006/12* (2013.01); *C01P 2006/14* (2013.01); *C01P 2006/40* (2013.01); *Y10S 977/811* (2013.01); *Y10S 977/896* (2013.01)

(58) Field of Classification Search
CPC . C01G 23/053; C01G 23/005; C01P 2002/22; C01P 2002/72; C01P 2002/82; C01P 2002/88; C01P 2006/12; C01P 2006/14; C01P 2006/40; C01P 2006/04; C01P 2004/04; Y10S 977/896; Y10S 977/811; H01M 4/485; H01M 4/48; B82Y 40/00
See application file for complete search history.

(56) References Cited

PUBLICATIONS

Liu et al (NPL: "Sandwich-Like, Stacked Ultrathin Titanate Nanosheets for Ultrafast Lithium Storage", Advanced Materials Feb. 21, 2011, vol. 23, pp. 998-1002).*

* cited by examiner

*Primary Examiner* — Melvin C Mayes
*Assistant Examiner* — Smita Patel
(74) *Attorney, Agent, or Firm* — Sughrue Mion, PLLC

(57) ABSTRACT

The present invention discloses a method preparing a $TiO_2$ nanostructure comprising: mixing an organic acid and an aminoalcohol to form an ionic liquid; heating the ionic liquid with titanium ions and lithium ions to form a layered structure; and annealing the mixture to form the $TiO_2$ nanostructure. There is also provided uses of the prepared nanostructure.

11 Claims, 9 Drawing Sheets

METHOD OF PREPARING A TIO2 NANOSTRUCTURE

FIELD OF THE INVENTION

The present invention relates to a method of a preparing $TiO_2$ nanostructure. The present invention also relates to uses of the $TiO_2$ nanostructures prepared from the method.

BACKGROUND OF THE INVENTION

Nanomaterials in architecture for green energy conversion and/or storage provide a desirable approach to alleviate environmental and energy issues. Titanium dioxide ($TiO_2$) is regarded as one of the ideal candidates for high-rate anode materials, owing not only to its structural characteristics and special surface activity, but also to its low cost, safety, and environmental benignity.

However, the problem is the lack of open channels in bulk $TiO_2$ which restricts its capacity and rate capability for reversible lithium insertion and extraction. A reduction in the effective size and construction of open channels in the material are the main strategies currently employed to increase the rate performance. Significant efforts have been made on the fabrication of anatase $TiO_2$ nanosheets with exposed highly reactive (001) facets. Although the anatase framework undergoes insignificant structural distortion during lithium insertion and extraction, the rate of lithium diffusion is still limited by the narrow space of the host Ti—O lattice. For example, $F^-$ doped $TiO_2$ nanosheets were proved to be good host structure for fast lithium insertion/extraction, due to its large exposed effective area and a short diffusion path. Unfortunately, strongly corrosive NaOH, HCl or HF solutions, which are very harmful to the environment, were used to obtain these desired materials. There is also potential danger in the high-temperature and high-pressure process in low boiling point inflammable solvents. Hence, it is an urgent task and challenge to synthesize novel $TiO_2$ framework by a facile and clear route.

There is therefore a need for an improved method to prepare $TiO_2$ nanostructures.

SUMMARY OF THE INVENTION

The present invention seeks to address at least one of the problems in the prior art, and provides a low cost and environmentally friendly method of preparing $TiO_2$ nanostructures.

According to a first aspect, there is provided a method of preparing a $TiO_2$ nanostructure comprising:
(a) mixing an organic acid and an aminoalcohol to form an ionic liquid;
(b) heating the ionic liquid together with titanium ions and lithium ions to form a layered structure; and
(c) annealing the layered structure to form the $TiO_2$ nanostructure.

Any suitable organic acid may be used for the purposes of the present invention. According to a particular aspect, the organic acid may be a carboxylic acid. For example, the carboxylic acid may be methanoic acid, ethanoic acid, propanoic acid, butanoic acid, pentanoic acid, or a combination thereof.

Any suitable aminoalcohol may be used for the purposes of the present invention. According to a particular aspect, the aminoalcohol may be an N-alkylated aminoalcohol. For example, the N-alkylated aminoalcohol may be N,N-dimethylethanolamine, N,N-diethylethanolamine, or a combination thereof.

The titanium ions and the lithium ions may be from any suitable source. For example, the titanium ions may be from a titanium source selected from the group consisting of tetrabutyl titanate, titanium isopropoxide, titanium ethoxide, and a combination thereof. The lithium ions may be from a lithium source selected from the group consisting of: lithium acetate, lithium chloride, lithium methoxide, lithium ethoxide, lithium propoxide, lithium butoxide, and a combination thereof.

The $TiO_2$ nanostructure may comprise a plurality of layers of $TiO_2$ nanosheets. For example, the layers of $TiO_2$ nanosheets may be stacked. In particular, the $TiO_2$ nanostructure may comprise alternating titanate nanosheets and ionic liquid molecular layers. According to a particular aspect, the thickness of each nanosheet may be about 0.4-1.0 nm. In particular, the thickness of each nanosheet may be about 0.4 nm.

According to a particular aspect, the method may comprise heating the ionic liquid together with lithium ions and titanium ions prior to the annealing. The heating may comprise heating at any suitable temperature. For example, the heating may comprise heating at a temperature of about 160-220° C.

The annealing may be under suitable conditions. For example, the annealing may be at a suitable temperature. According to a particular aspect, the annealing may be at a temperature of about 200-400° C.

A second aspect of the present invention provides a $TiO_2$ nanostructure prepared according to the method described above.

A third aspect of the present invention provides a battery comprising a $TiO_2$ nanostructure prepared according to the method described above. For example, the battery may be a lithium-ion battery.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION OF THE INVENTION

Figure 1:
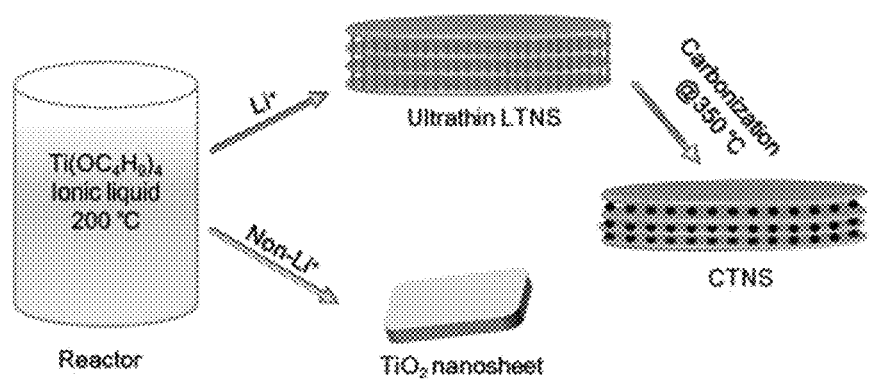
FIG. 1 shows a schematic representation of one embodiment of the present invention.

The present invention provides a method of preparing $TiO_2$ nanostructures which allow ultrafast surface lithium storage due to maximised $Li^+$ ion diffusion and electron transport and the elimination of the $Li^+$ ion diffusion process in $TiO_2$ bulk. In prior methods known in the art, it is not practical to obtain such a structure directly because of the Ostwald ripening process. However, the method of the present invention overcomes this problem and provides a method of preparing the $TiO_2$ nanostructure in which an appropriate IL system is selected, the $TiO_2$ nanostructure is thermally stable without deformation or condensation, and wherein the $TiO_2$ nanostructure retains highly active surfaces or open channels.

Further, the method of the present invention is a simple and low cost method. The method of the present invention is also environmentally friendly and does not have an adverse environmental impact, which is an important factor in view of the concerns at which industrial methods can impact the environment. The method of the present invention may also be easily scaled up to an industrial scale.

Therefore, according to a first aspect, the present invention provides a method of preparing a $TiO_2$ nanostructure comprising:
(a) mixing an organic acid and an aminoalcohol to form an ionic liquid;
(b) heating the ionic liquid together with titanium ions and lithium ions to form a layered structure; and
(c) annealing the layered structure to form the $TiO_2$ nanostructure.

In particular, the method uses ionic liquids. Ionic liquids exhibit unique properties including low volatility, a wide liquid temperature range, good dissolving ability, and designability. Further, ionic liquids are also environmentally friendly media. The method of the present invention enables synthesis of stacked $TiO_2$ nanosheets, in which the carbon pillars provide open channels for ultrafast lithium ion diffusion and the ultrathin framework renders the storage of lithium almost exclusively on the surface. As a result, the $TiO_2$ nanostructure exhibits superior capacity and high-rate performance.

According to a particular aspect, the ionic liquid is formed by mixing an organic acid and an aminoalcohol. The organic acid and aminoalcohol may be selected based on the ionic liquid to be obtained for preparing the $TiO_2$ nanostructure. Any suitable organic acid may be used for the purposes of the present invention. According to a particular aspect, the organic acid may be a carboxylic acid. The carboxylic acid may be a carboxylic acid comprising one to five carbon atoms. For example, the carboxylic acid may be, but not limited to, methanoic acid, ethanoic acid, propanoic acid, butanoic acid, pentanoic acid, or a combination thereof.

Any suitable aminoalcohol may be used for the purposes of the present invention. According to a particular aspect, the aminoalcohol may be an alkylated aminoalcohol. In particular, the aminoalcohol may be an N-alkylated aminoalcohol. For example, the N-alkylated aminoalcohol may be, but not limited to, N,N-dimethylethanolamine, N,N-diethylethanolamine, or a combination thereof.

According to a particular aspect, acetic acid and N,N-dimethylethanolamine is mixed to form a protic ionic liquid, $[(CH_3)_2N^+(H)-C_2H_4OH][CH_3COO^-]$. The ionic liquid may be a solvent with high density and low vapor pressure. In addition, the ionic liquid may be an effective structure-directing agent for a layered framework and the —OH groups can easily connect to O and N to form intermolecular hydrogen bonds. With the aid of these abundant hydrogen bonds, the well-organized organic molecular layers may be formed with good stability.

Titanium ions and lithium ions may be added to the ionic liquid. The titanium ions may be from any suitable source. For example, the titanium ions may be from a titanium source selected from the group consisting of tetrabutyl titanate $(Ti(OC_4H_9)_4)$, titanium isopropoxide, titanium ethoxide, and a combination thereof.

The lithium ions may be from any suitable source. The lithium ions may be from a lithium source selected from the group consisting of: lithium acetate, lithium chloride, lithium methoxide, lithium ethoxide, lithium propoxide, lithium butoxide, and a combination thereof. The lithium ions may regulate the direction of the crystal growth in the method.

The method may further comprise heating the ionic liquid after adding titanium ions and lithium ions prior to the annealing of the mixture. For example, the heating may be at a temperature of about 160-220° C. In particular, the heating may be at a temperature of about 170-210° C., 180-200° C., 190-195° C. According to a particular aspect, the heating may be at a temperature of about 200° C. The heating may be for a pre-determined period of time. For example, the pre-determined period of time may be about 1-15 hours, 3-12 hours, 5-10 hours, 7-9 hours. Even more in particular, the pre-determined period of time may be about 10 hours.

A layered structure may be formed following the heating. The layered structure may comprise layered titanate nanosheets. In particular, the layered structure comprises a plurality of layered and stacked titanate nanosheets. Even more in particular, the layered structure is an ultrathin layered structure. The layered structures may be stacked in an orderly manner with each titanate nanosheet stacked adjacent to another titanate nanosheet in a vertical direction.

The method also comprises annealing the layered structure to form the $TiO_2$ nanostructure. The annealing may be under suitable conditions. For example, the annealing may be at any suitable temperature. The annealing may be at a temperature of about 200-400° C. In particular, the annealing may be at a temperature of about 200-400° C., 250-375° C., 275-350° C., 300-325° C. Even more in particular, the annealing may be at a temperature of about 350° C.

The annealing may be for a pre-determined period of time. For example, the annealing pre-determined period of time may be any suitable amount of time required to obtain the desired nanostructure. In particular, the annealing pre-determined period of time may be 1-6 hours, 2-5 hours, 3-4 hours. Even more in particular, the annealing pre-determined period of time may be about 2 hours.

The annealing may result in the formation of in situ carbonization of the organic molecular layers within the layered structure. In particular, the annealing may result in the partial collapse of the layered structure comprising the layered titanate nanosheets to form ultrathin anatase $TiO_2$ nanosheets. In particular, the $TiO_2$ nanostructure may comprise alternating titanate nanosheets and ionic liquid molecular layers. During the annealing process, the organic components of the ionic liquid molecular layers may be partially carbonized in situ due to the strong bonding force between the titanate and ionic liquid molecular layers, thereby forming the $TiO_2$ nanostructure.

According to a particular aspect, the thickness of each nanosheet may be about 0.4-1.0 nm. In particular, the average thickness of each nanosheet may be about 0.4 nm. The average thickness of the $TiO_2$ nanostructure may be about 5-10 nm.

Figure 2:
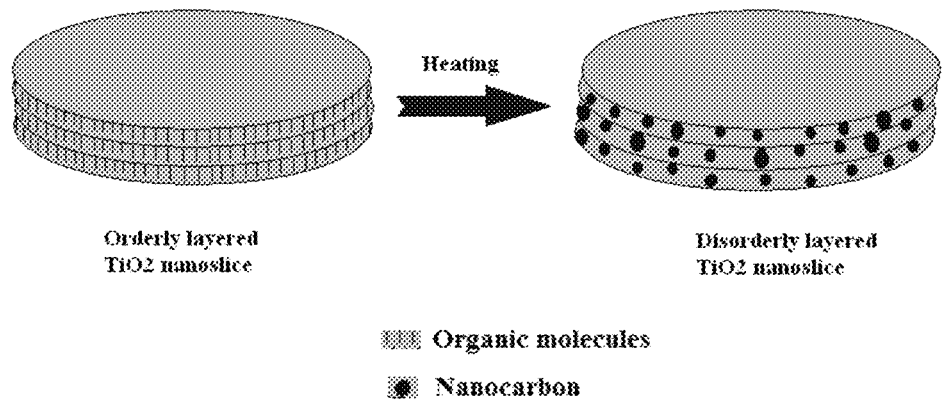
FIG. 2 shows a schematic representation of the structure of the $TiO_2$ nanostructure prepared from one embodiment of the method of the present invention.

A schematic representation according to a particular embodiment of the method of the present invention is shown in FIG. 1. In particular, a mixture of $[(CH_3)_2N^+(H)—C_2H_4OH][CH_3COO^-]$ as the ionic liquid and tetrabutyl titanate in the presence of lithium ions is heated in a reactor at 200° C. With the aid of the lithium ions and strong hydrogen bonds in the ionic liquid system, a stable multilayer structure is formed in an orderly manner. Following annealing, which results in the carbonization of the multilayer structure, a $TiO_2$ nanostructure may be formed which comprises alternating ultrathin titanate nanosheets and ionic molecular layers as seen in FIG. 2. As shown in FIG. 1, in the absence of lithium ions under the same reaction conditions as described above, layered titanate nanosheets are not obtained. Accordingly, the lithium ions play a role as a structure-directing agent other than the ionic liquid in limiting the crystal growth along the [010] direction and forming stable layered titanate nanosheets together with the ionic liquid.

The method of the present invention results in the formation of a $TiO_2$ nanostructure formed by stacking of several ultrathin nanosheets. In particular, the $TiO_2$ nanostructure may be a disc-like nanostructure. According to a particular embodiment, the thickness of a single layer within the $TiO_2$ nanostructure may be about 0.4 nm thick which is consistent with a single-unit-cell thickness along the [010] direction. The $TiO_2$ nanostructure may be bound by (010) facets. The (010) facets are ideal since they possess empty zig-zag channels with large Ti—Ti distances to allow sufficient and fast lithium ion diffusion. Accordingly, the storage of lithium in the $TiO_2$ nanostructured prepared by the method of the present invention mainly takes place on the surface, which is completely different from the insertion of lithium into bulk anatase $TiO_2$ materials. The pseudocapacitive insertion and extraction renders remarkable improvement in high-rate charging and discharging. Further, the in situ derived carbon as a result of the annealing can significantly stabilise these stacked $TiO_2$ nanostructures, leading to an excellent cycle life. For example, the $TiO_2$ nanostructures prepared from the method of the present invention exhibit superior capacity and high-rate performance.

A second aspect of the present invention provides a $TiO_2$ nanostructure prepared according to the method described above.

The $TiO_2$ nanostructure may be as described above. For example, the $TiO_2$ nanostructure may be a stable multilamellar $TiO_2$ nanostructure comprising a plurality of stacked ultrathin nanosheets. In particular, the $TiO_2$ nanostructure may comprise alternating layers of ultrathin titanate nanosheets and ionic liquid molecular layers. In particular, the $TiO_2$ nanostructure comprises uniformly dispersed carbon components derived by the carbonization of the ionic liquid molecular layers.

According to a particular aspect, the average thickness of each layer comprised within the $TiO_2$ nanostructure may be about 0.4-1.0 nm. In particular, the average thickness of each layer within the $TiO_2$ nanostructure may be about 0.4 nm.

The $TiO_2$ nanostructure may comprise a plurality of ultrathin $TiO_2$ nanosheets along the [010] direction. The $TiO_2$ nanosheets may be bound by (010) facets which may possess empty zigzag channels with large Ti—Ti distances to allow lithium ion diffusion. The $TiO_2$ nanosheets comprised in the $TiO_2$ nanostructure may be disordered.

The $TiO_2$ nanostructure prepared according to the method of the present invention may be used in many different applications. For example, the $TiO_2$ nanostructure may be used as a high-power anode material. Accordingly, a third aspect of the present invention provides a battery comprising a $TiO_2$ nanostructure prepared according to the method described above. For example, the battery may be a lithium-ion battery. In particular, the battery may be a high-power lithium-ion battery.

Having now generally described the invention, the same will be more readily understood through reference to the following examples which are provided by way of illustration, and are not intended to be limiting.

Examples

All chemicals used in the present example were obtained from Sigma-Aldrich.

Synthesis of Ionic Liquid (IL)

The synthesis of the IL was carried out in a 500-mL round-bottomed flask, which was immersed in an ice-bath. Acetic acid (60.0 g, 1.0 mol) was added dropwise into N,N-dimethylethanolamine (98 g, 1.1 mol). After vigorous stirring for 2 hours, the reaction mixture was purified and dried with the aid of a rotary evaporator at 80° C. The obtained protic IL was then directly used to prepare the titanate material.

Preparation of $TiO_2$ Nanostructure

In a typical experiment, 11 g of tetrabutyl titanate was first added to 50 g of IL containing $CH_3COOLi$ (0, 0.01, or 0.04 mol) to form the tetrabutyl titanate-IL solution. The solution was transferred into Teflon-lined stainless steel reactors and then heated at 200° C. for 10 hours. After reaction, a white powder was obtained by centrifugation, washed with ethanol and water several times, and then dried in oven at 100° C. for 10 hours. This was then followed with annealing. The annealing time of each sample was 2 hours at different temperatures (200, 250, 300, 350, and 400° C.).

Characterisation

XRD measurement was performed with a D8 diffractometer with Cu-KR radiation (λ=1.54056 Å). TEM examination was carried out with JEOL JEM-1400 and JEOL 2100F. $N_2$ adsorption-desorption isotherms were conducted at 77 K on a Micromeritics Tristar 3000 analyzer. The BET surface areas and pore-size distribution curves were calculated using adsorption data. Thermogravimetric analysis was determined using a thermal gravity analyzer (TGA) at a temperature rise rate of 10° C./minute from room temperature to 600° C. under continuous air flow. For $^{13}C$ and $^1H$ CP/MAS or magic angle spinning (MAS) NMR measurements, a JNM-ECA400 spectrometer was used at 100.5 and 400.0 MHz, respectively. FTIR spectra were recorded on a Shimazu IR Prestige-21 FT-IR Spectrometer. Raman spectra were collected on an R-3000HR spectrometer using a red LED laser (λ=785 nm).

Electrochemical Measurements

The electrochemical tests were performed using two-electrode Swagelok-type cells with lithium serving as both the counter and reference electrodes at room temperature. The working electrode was composed of 70 wt % of the active material, 20 wt % of conductivity agent (carbon black, Super-P—Li), and 10 wt % of binder (polyvinylidene difluoride (PVDF) (Aldrich)). The active material (CTNS) was about 1-2 mg on each electrode and the film was about 20 μm in thickness. The electrolyte used was 1 M $LiPF_6$ in a 1:1 (w/w) mixture of ethylene carbonate and diethyl carbonate. Cell assembly was carried out in an argon-filled glove box. Cyclic voltammetry (CV; 1-3 V, 1 mV/s) was performed using an electrochemical workstation (CHI 660 C). Galvanostatic charge-discharge cycling was conducted using a battery tester (NEWAER) with a voltage window of 1-3 V at different current rates of 1 C, 2 C, 5 C, 10 C, 20 C, 30 C, and 50 C, where 1 C=170 mA/g.

Results and Discussion

The morphologies of the samples were examined by transmission electron microscopy (TEM). From the TEM images, the as-synthesized sample consists of layered titanate nanosheets (LTNS) with a lateral size of 20-50 nm (FIG. 3a), and the magnified image displays the layered structure with an interlamellar spacing of about 1 nm. The high-resolution (HR) TEM image (FIG. 3b) of the gray sample obtained by annealing at 350° C. for 2 hours, clearly shows that the disc-like nanostructures (carbon-supported stacked $TiO_2$ nanosheets (CTNSs)) are formed by stacking of several ultrathin nanosheets. The single layer thickness of about 0.4 nm is consistent with the single-unit-cell thickness along the [010] direction. Therefore, the nanosheets are bound by (010) facets, which is also revealed by the 2D lattice fringes observed via HRTEM. The exposed (010) facets are the ideal facet, possessing empty zigzag channels with large Ti—Ti distances for lithium ion diffusion.

Figure 3:
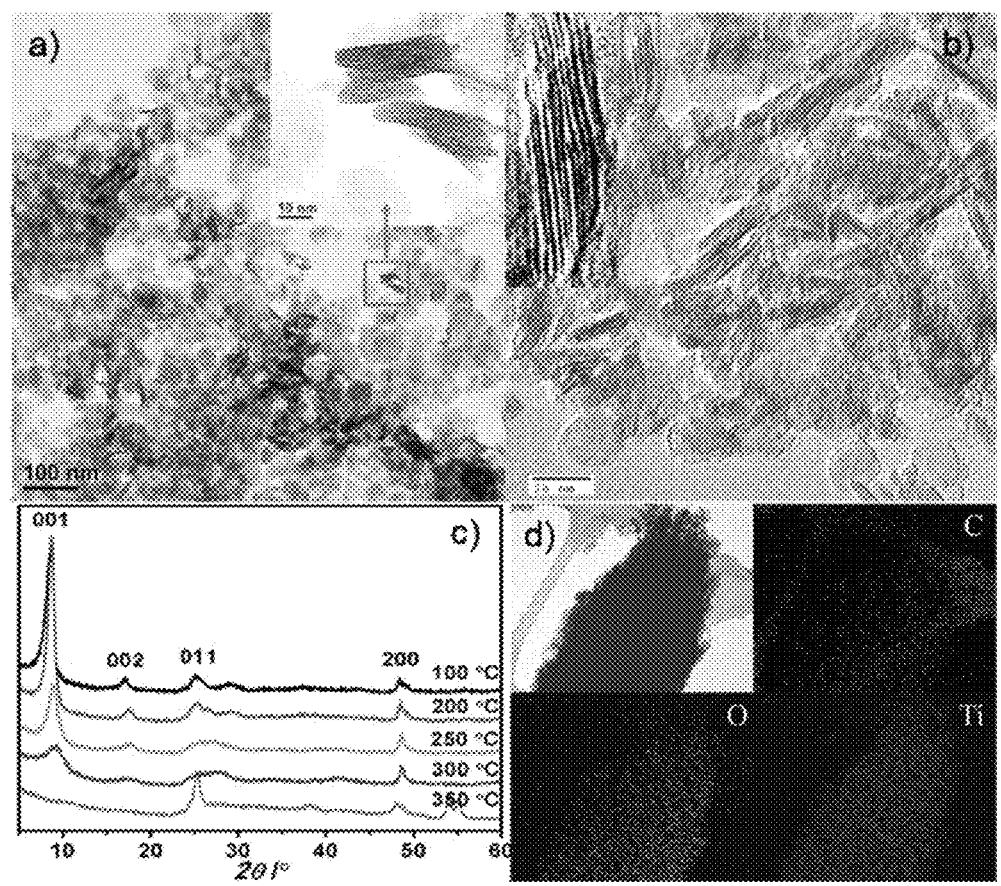
FIG. 3 shows the TEM images of the as-synthesized LTNSs (a) and the CTNSs obtained after annealing at 350° C. for 2 hours (b). XRD patterns of the samples annealed at different temperatures (100, 200, 250, 300, and 350° C.) (c) and elemental mapping of CTNSs (d). The insets in (a) and (b) are the magnified images of the corresponding samples.
Figure 4:
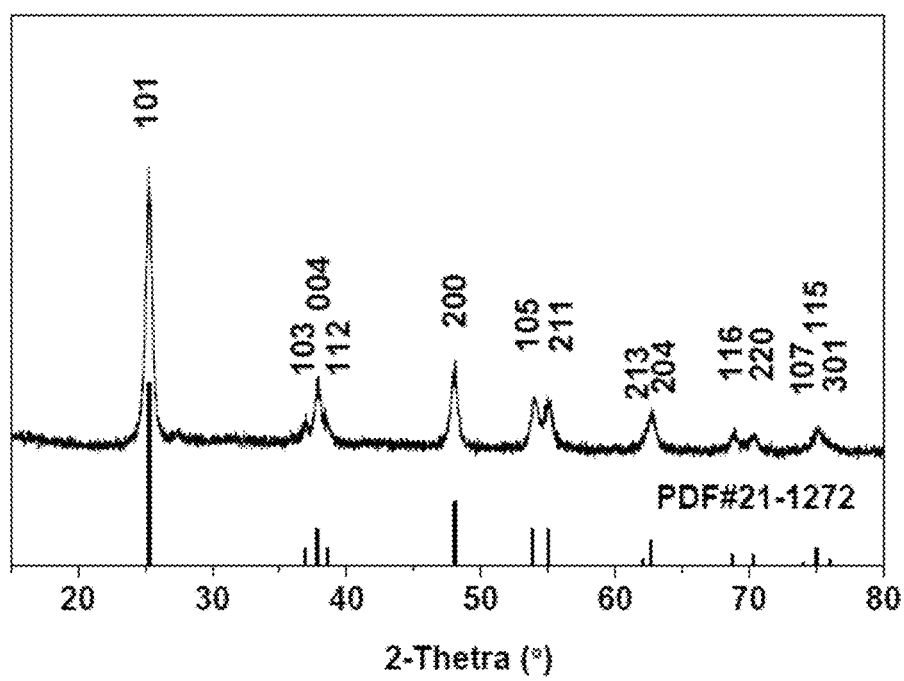
FIG. 4 shows the XRD spectrum of the sample annealed at 400° C.

The layered structure of the as-synthesized sample was also observed by powder X-ray diffraction (XRD) analysis (FIG. 3c). The strong Bragg peak at 2θ=8.48° from the as-synthesized LTNSs indicates a well-defined multilamellar structure with an interlayer spacing of 10.41 Å, which is consistent with the result from the TEM analysis. This interlayer spacing is bigger than the reported layered hydrous titanate. The peak intensity decreased significantly when the annealing temperature increased from 250 to 300° C., due to the carbonization of the intercalated organic components in the LTNSs. After calcination at 350° C., the ordered LTNSs were superseded by the disordered ones. At the same time, the anatase $TiO_2$ phase became pronounced from the XRD pattern, indicating partial collapse of LTNS to form ultrathin anatase $TIO_2$ nanosheets. Further increasing the annealing temperature to 400° C. leads to complete removal of the nanocarbon components and formation of pure anatase $TiO_2$ phase, as shown in FIG. 4.

Figure 5:
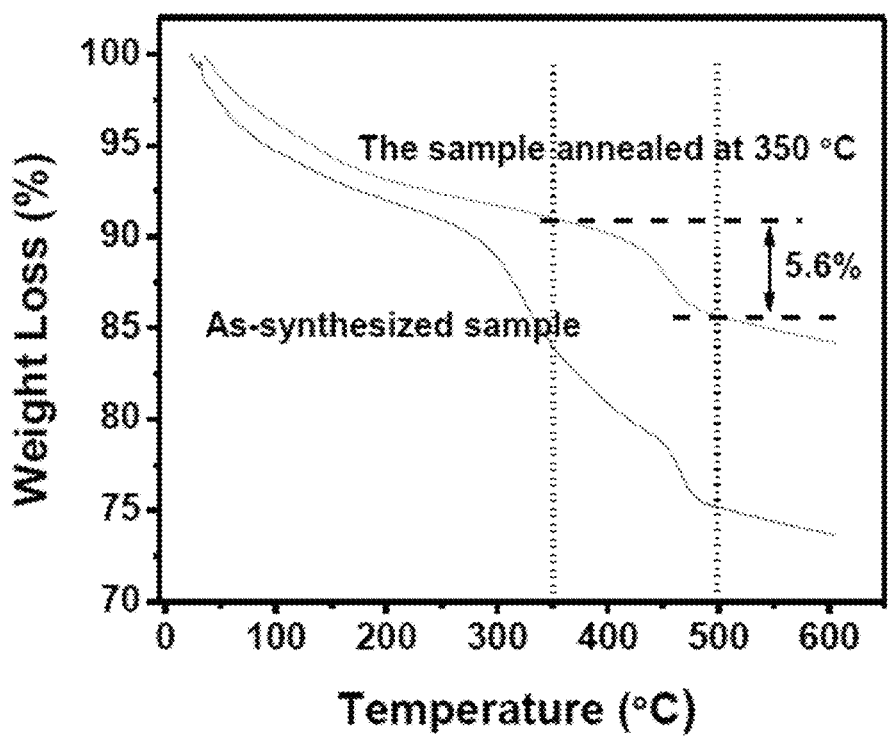
FIG. 5 shows the TGA analysis of the as-synthesized sample and the sample annealed at 350° C.

The presence of C, O, and Ti was detected by elemental mapping and energy-dispersive X-ray (EDX) analysis of the sample as shown in FIG. 3d. The uniformly dispersed carbon component in the CTNSs is derived by in situ carbonization of the residual organic species that stabilize the LTNSs. This is further evidenced by the thermogravimetric analysis (TGA) as shown in FIG. 5. The TGA curve of the LTNSs shows a total weight loss of ca. 25% which was recorded from room temperature to 500° C., during which the organic components were removed completely. The sample annealed at 350° C. still contained about 5.6% nanocarbons by weight, compared with the sample annealed at 200° C. These nanocarbon pillars not only strengthen the stacked ultrathin layers and prevent complete condensation, but also offer ample space for $Li^+$ ion diffusion.

Figure 6:
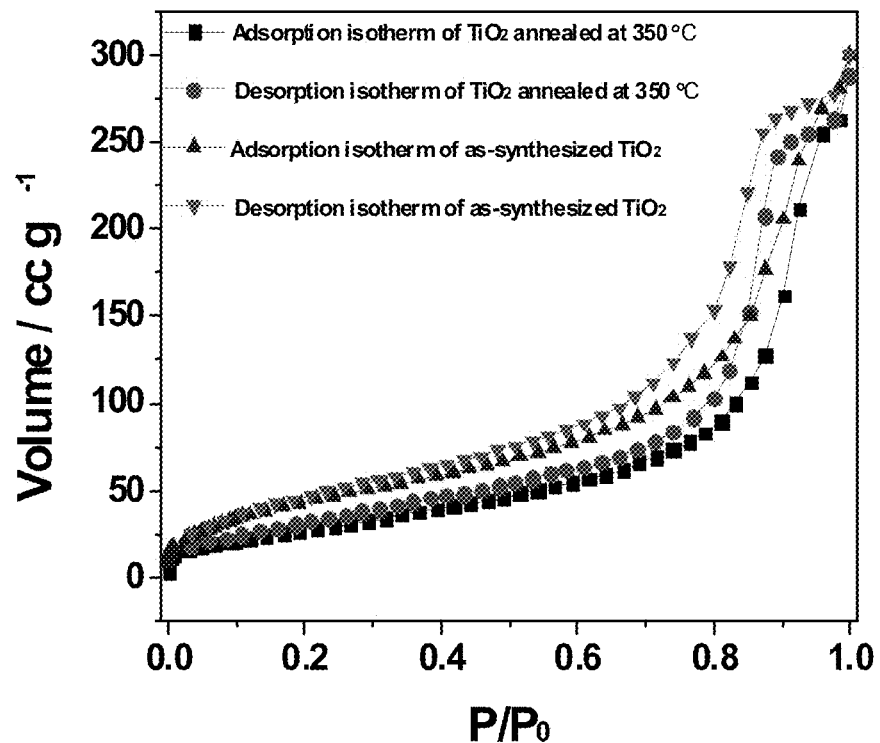
FIG. 6 shows the $N_2$ adsorption-desorption isotherms of the as-synthesized samples and the samples annealed at 350° C.
Figure 7:
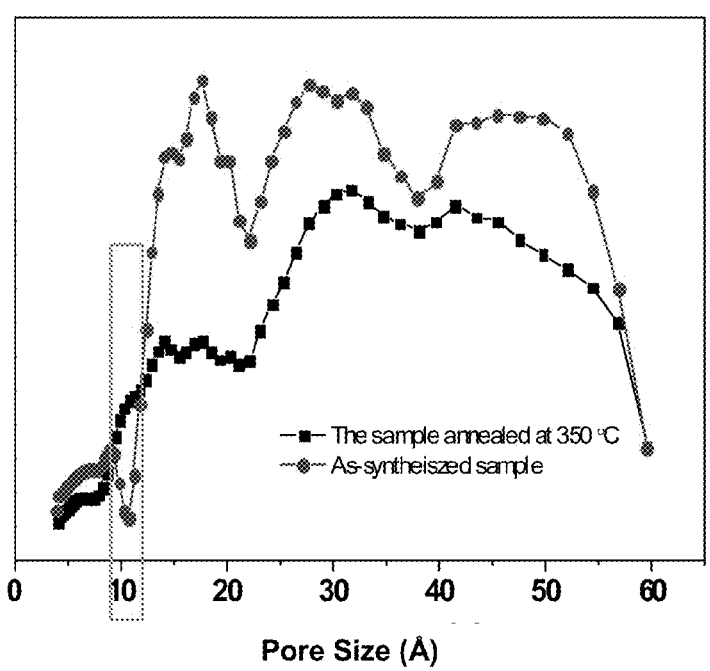
FIG. 7 shows the pore size distributions of LTNSs and CTNSs calculated from $N_2$ adsorption-desorption isotherms at 77 K using DFT (density functional theory) method.
Figure 8:
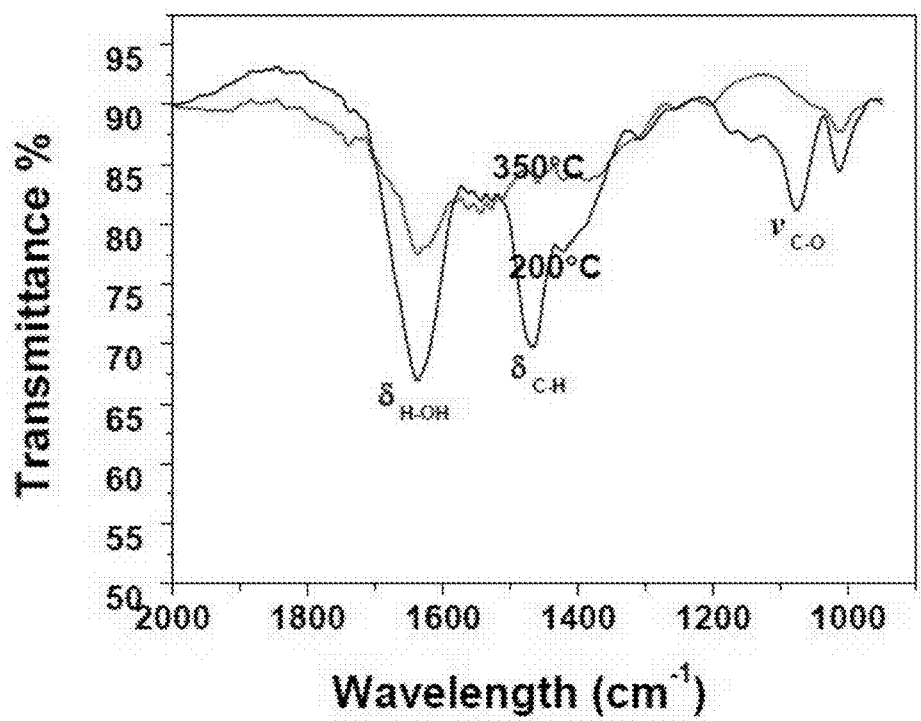
FIG. 8 shows FTIR spectra of LTNSs and CTNSs. From the IR spectra, the peaks of C—H and C—OH groups almost disappear.
Figure 9:
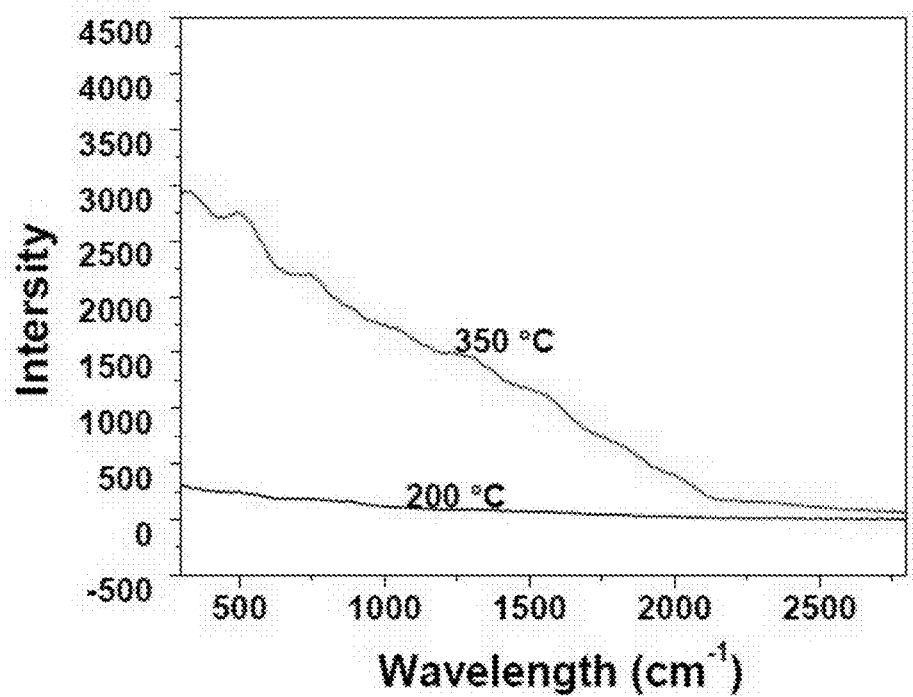
FIG. 9 shows the Raman spectra of LTNSs and CTNSs. The crystallinity of the carbon in Raman spectra cannot be clearly shown.

The samples were further characterized by $N_2$ adsorption-desorption isotherms and corresponding pore size distributions (FIGS. 6 and 7). It can be observed that the abrupt increase of the pore fraction with size above ≈1 nm in the as-synthesized LTNSs. This observation is related to the uniform stacked structure. The surface area of the as-synthesized sample was 167 $m^2/g$. The surface area and total pore volume of the CTNSs after annealing at 350° C. were 109 $m^2/g$ and 0.09 $cm^3/g$, respectively. Notably, the CTNSs possess smaller total pore volume but larger pore diameter compared with LTNSs because of the carbonization of organic components which maintains disorderly layered $TiO_2$ nanosheets. In addition, Fourier transform infrared (FTIR) and Raman spectra further supported the analysis of carbonization. The FTIR spectra (FIG. 8) shows the absorption bands of C—H and C—OH bonds in CTNSs sample are almost flattened. The crystallinity of the carbon in Raman spectra is indiscernible (FIG. 9) which may be due to the difficulty in forming highly crystalline carbon by carbonization of the single organic layer in intercalation at such a low temperature.

Figure 10:
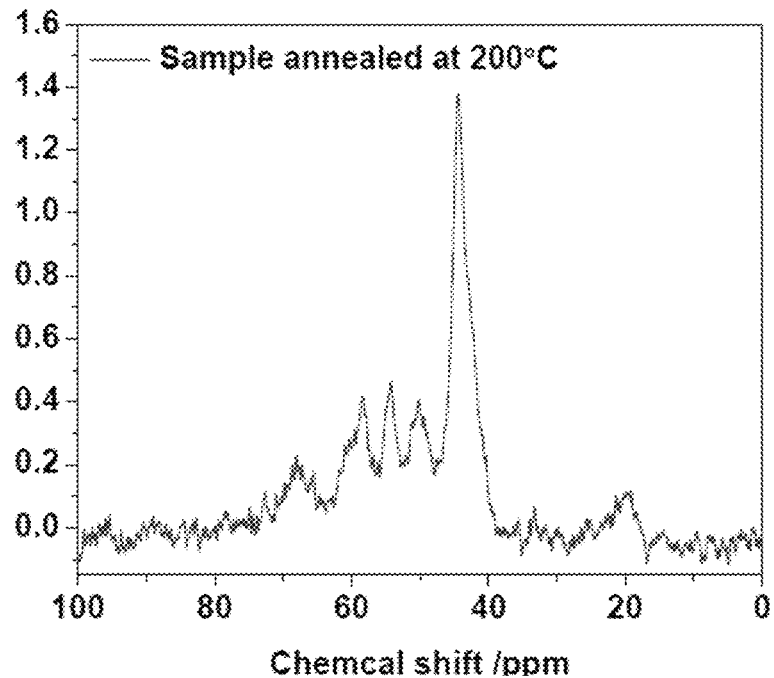
FIG. 10 shows the cross polarization/magic angle spinning solid state $^{13}$C NMR spectrum.
Figure 11:
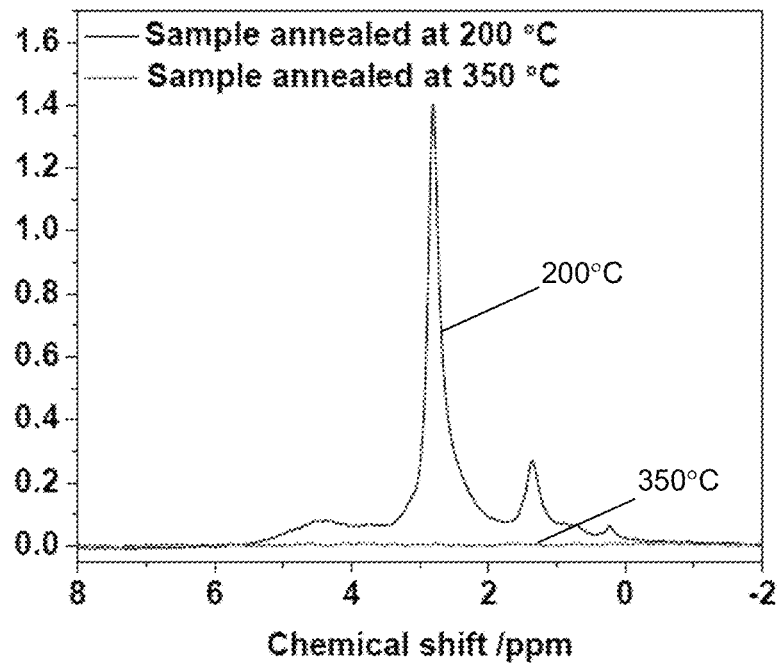
FIG. 11 shows the cross polarization/magic angle spinning solid state $^1$H NMR spectra.

Solid-state $^{13}C$ and $^1H$ NMR spectra were employed to support the mechanism shown in FIG. 1. The organic carbon component in the intercalated IL layers was identified using the cross polarization/magic angle spinning (CP/MAS) solid state $^{13}C$ NMR spectrum (FIG. 10). In general, the removal of IL layers leads to complete condensation of the layered titanate structure during the annealing processes at 350° C. However, the CP/MAS solid state $^1H$ NMR spectrum (FIG. 11) shows that these organic components are partially carbonized at 350° C. in situ, due to the strong bonding force between the titanate and organic layers. This confirms that the final structure is the CTNSs.

Figure 12:
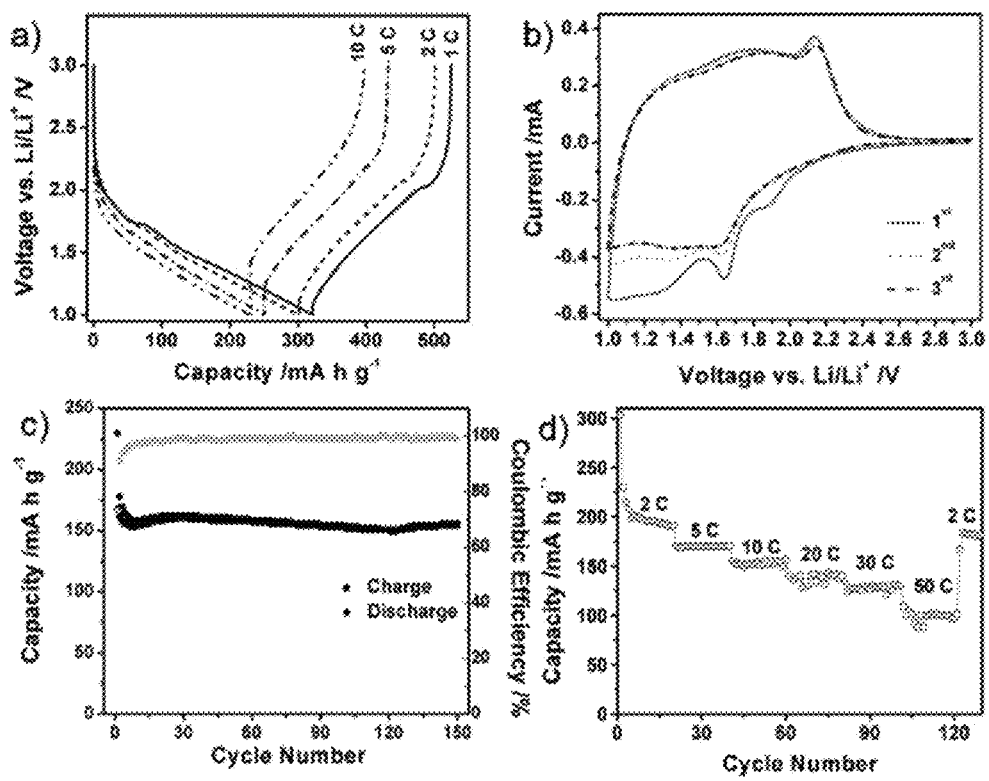
FIG. 12 shows the electrochemical measurements of the CTNSs. (a) the first-cycle charge-discharge voltage profiles at different current rates of 1 C, 2 C, 5 C, and 10 C. (b) Representative cyclic voltammograms at a scan rate of 1 mV/s. (c) Cycling performance of the CTNSs cycled at a constant current drain of 10 C and the corresponding Coulombic efficiency and (d) cycling performance at different charge-discharge rates (2-50 C)

The electrochemical studies of the CTNSs obtained by annealing LTNSs at 350° C. were conducted using two-electrode Swagelok-type cells with lithium metal serving as both the counter and reference electrodes at room temperature as explained above. The charge-discharge voltage profiles of the first cycle are shown in FIG. 12a. The first cycle discharge capacities at different current drains of 1 C, 2 C, 5 C, and 10 C (1 C=170 mA/g) were 321.2, 301.2, 250.6, and 229.6 mA h $g^{-1}$, respectively, much higher than the theoretical capacity of 167.5 mA h g$^{-1}$. The lithium insertion/extraction into layered TiO$_2$ may be described by the following equation:

$$TiO_2+x(Li^++e^-)=Li_xTiO_2$$

Figure 13:
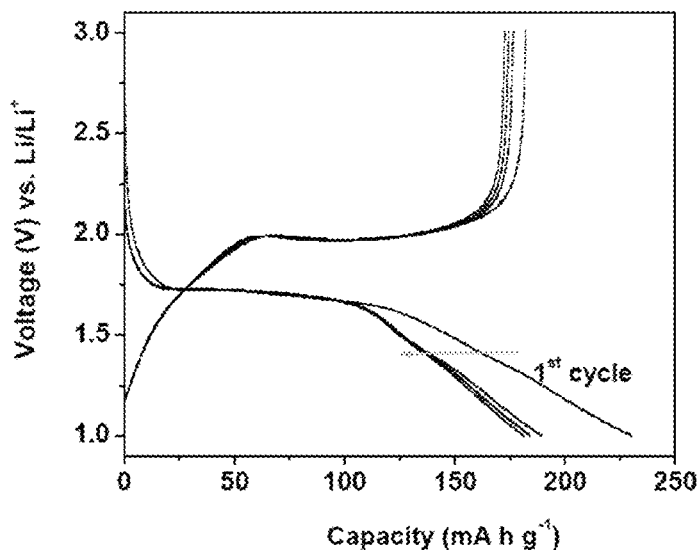
FIG. 13 shows the first four cycles charge/discharge voltage profiles of anatase $TiO_2$ obtained from CTNSs after annealing at 400° C. at 1 C.

The capacity of 321 mA h g$^{-1}$ corresponds to x=0.96 in Li$_x$TiO$_2$ for the first lithium insertion at a current drain of 1 C. Each discharge-charge curve has an almost immutable gradient at different rates, and this behavior was completely different from that of the anatase TiO$_2$ materials annealed at 400° C. (FIG. 13), which showed the characteristic plateaus at specific voltages during charge-discharge. This may be related to the unique structure of the CTNSs, in which the grain boundaries are improved by the strong interaction of the amorphous carbon with the TiO$_2$ crystalline and ultrathin 2D nanosheet structure. More specifically, the Li$^+$ ion diffusion and charge transfer activity takes place mainly on the surface of the CTNSs, which mimic the features in electrochemical capacitors. As a result, the intrinsic voltage plateaus related to biphasic transformation are not observed. Carbon nanomaterials and ultrafine TiO$_2$ nanocrystals also exhibited the similar loss of voltage plateaus, owing to their highly efficient grain boundaries that stem from their porous structure and reduced size.

The cyclic voltammetric curves (FIG. 12b) were also different from those of other anatase TiO$_2$-based anodes. It shows that the broad peaks at about 1.80 V of the cathodic sweep and 1.54 V of the anodic sweep are present. This may be attributed to the unique structure of the CTNSs, which is similar to that of the graphitic carbon with open channels for Li insertion and extraction. Nevertheless, the signature current peaks of TiO$^2$ were still visible at voltages of about 1.65 V and about 2.1 V.

Figure 14:
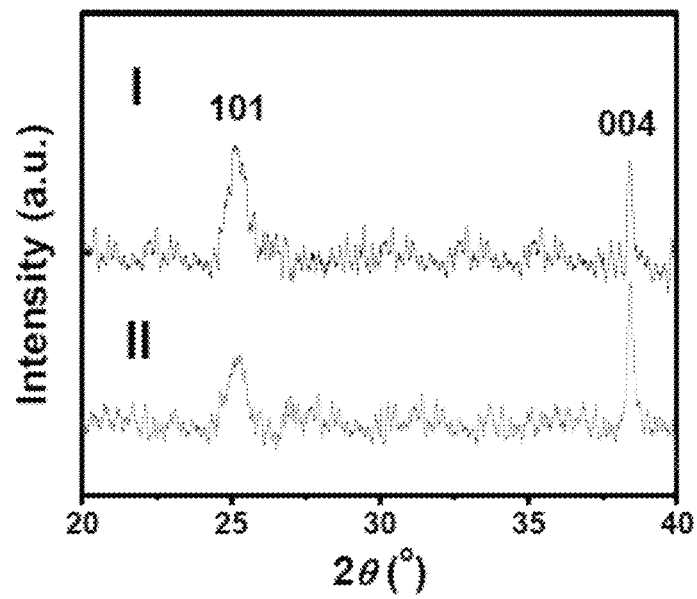
FIG. 14 shows the post-mortem XRD analysis. I—before test and II—after 150 charge/discharge cycles at a current rate of 10 C from 1 V to 3 V.

FIG. 12c shows the cycling performance of the CTNSs at a current drain of 10 C. The discharge capacity loss in the initial cycles stems from the irreversible replacement of the protons on CTNSs surface by lithium ion when discharging the battery. After 150 charge-discharge cycles a reversible discharge capacity as high as 155 mA h g$^{-1}$ was still retained, and the coulombic efficiency (calculated from the discharge and charge capacities) approached almost 100%. The rate performance of the CTNSs at 2-50 C was further investigated as shown in FIG. 12d, which clearly demonstrates excellent cyclability at all current rates. At lower rates, the discharge capacities at 2 C and 5 C were around 191 mA h g$^{-1}$ and 170 mA h g$^{-1}$, respectively. It still retained 135 and 125 mA h g$^{-1}$ at 20 C and 30 C, respectively. Even at the highest rate of 50 C (8.5 A/g), a capacity of 109 mA h g$^{-1}$ was delivered. Evidently, the electrochemical performance of the prepared CTNSs is superior to that of most existing TiO$_2$-based nanomaterials obtained under similar testing conditions. The electrochemical studies demonstrated that the CTNSs exhibit a superior reversible capacity, excellent cycling performance, and good rate capability. The stable structure is further confirmed by the post-mortem XRD results (FIG. 14).

Figure 15:
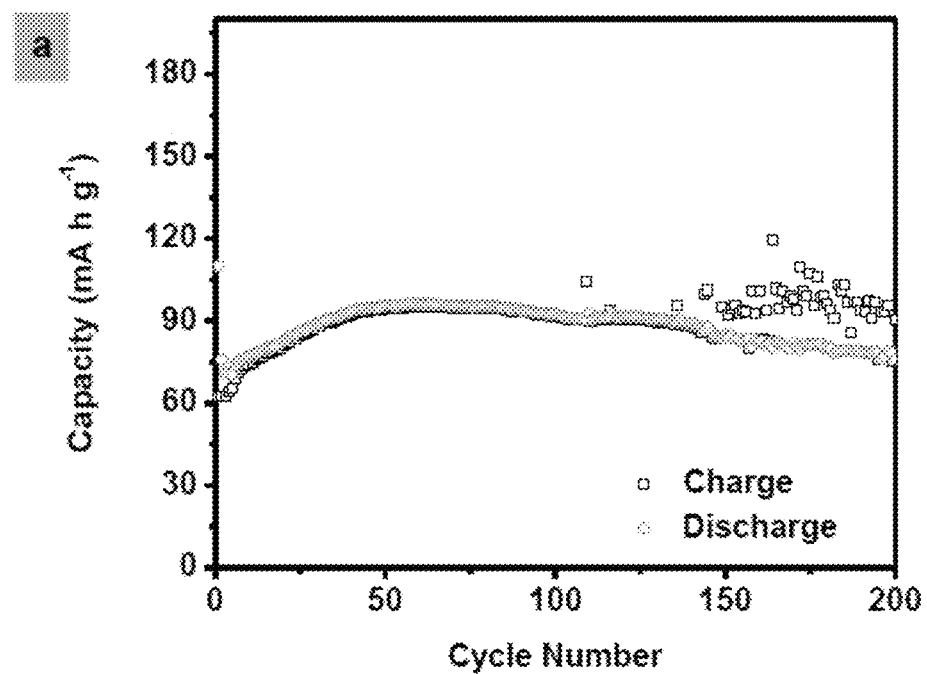
FIG. 15 shows (a) charge/discharge curves of the as-synthesised LTNSs annealed at 200° C. cycled at a constant current drain of 5 C; (b) Charge/discharge curves of the LTNSs annealed at 400° C. cycled at a constant current drain of 5 C and the corresponding Coulombic-efficiency profiles.
Figure 15:
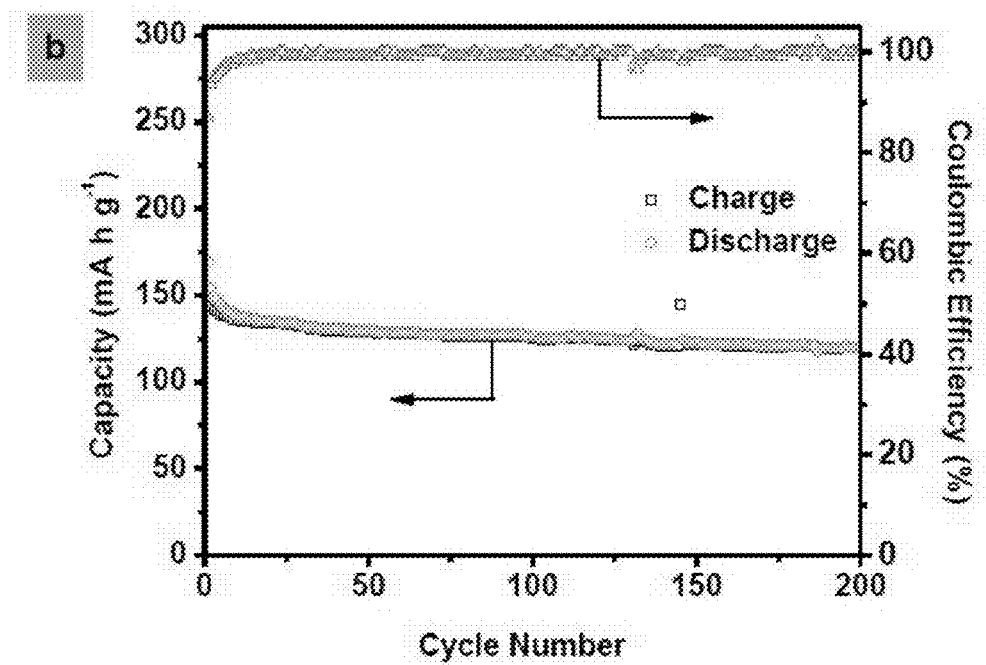
Figure 16:
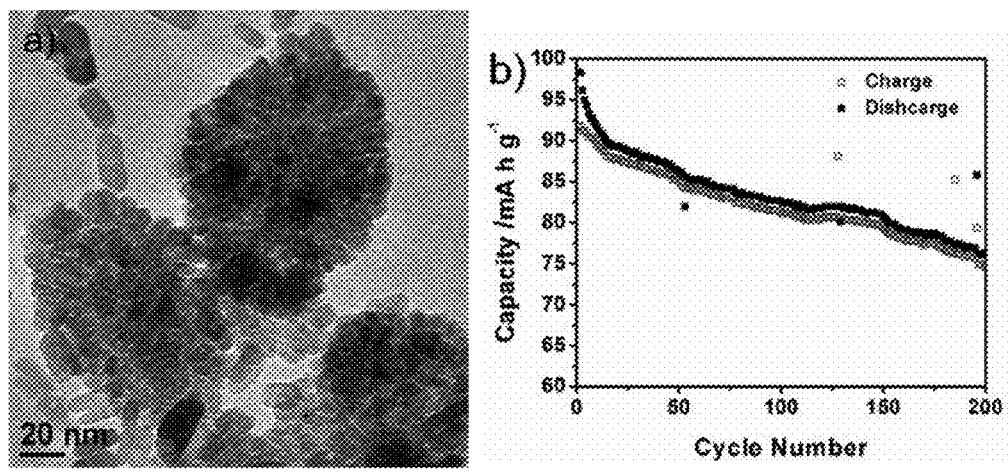
FIG. 16 shows (a) $TiO_2$ nanosheets obtained in the IL solution without $Li^+$ ions; and (b) charge-discharge curves of the $TiO_2$ nanosheets annealed at 350° C. cycled at a constant current drain of 5 C.

Comparative experiments were conducted to investigate the effect of calcination temperature and lithium ion concentration. The samples obtained by annealing LTNSs at 200 and 400° C. gave lower capacities compared to the one annealed at 350° C. After 100 full charge-discharge cycles, their discharge capacities remained only 91 and 125 mA h g$^{-1}$ at a current drain of 5 C respectively (FIG. 15). TiO$_2$ nanosheets were obtained at 200° C. in the absence of Li$^+$ ions in the synthesis system as shown in FIG. 16a. However, these nanosheets annealed at 350° C. exhibited a much lower capacity of no more than 100 mA h g$^{-1}$ at 5 C after the same annealing treatment (FIG. 16b). The synergetic effect of the IL and lithium ions, as well as the reaction temperature, therefore plays an important role in the formation of stable LTNSs.

Whilst the foregoing description has described exemplary embodiments, it will be understood by those skilled in the technology concerned that many variations in details of design, construction and/or operation may be made without departing from the present invention.

The invention claimed is:

1. A method of preparing a TiO$_2$ nanostructure comprising:
    (a) mixing an organic acid and an aminoalcohol to form an ionic liquid;
    (b) heating the ionic liquid together with titanium ions and lithium ions to form a layered structure; and
    (c) annealing the layered structure to form the TiO$_2$ nanostructure.

2. The method according to claim 1, wherein the TiO$_2$ nanostructure comprises a plurality of layers of TiO$_2$ nanosheets.

3. The method according to claim 2, wherein the thickness of each layer of TiO$_2$ nanosheet is about 0.4-1.0 nm.

4. The method according to claim 1, wherein the organic acid is a carboxylic acid.

5. The method according to claim 4, wherein the carboxylic acid is selected from the group consisting of: methanoic acid, ethanoic acid, propanoic acid, butanoic acid, pentanoic acid, and a combination thereof.

6. The method according to claim 1, wherein the aminoalcohol is a N-alkylated aminoalcohol.

7. The method according to claim 6, wherein the N-alkylated aminoalcohol is N,N-dimethylethanolamine, N,N-diethylethanolamine, or a combination thereof.

8. The method according to claim 1, wherein the titanium ions are from a titanium source selected from the group consisting of: tetrabutyl titanate, titanium isopropoxide, titanium ethoxide, and a combination thereof.

9. The method according to claim 1, wherein the lithium ions are from a lithium source selected from the group consisting of: lithium acetate, lithium chloride, lithium methoxide, lithium ethoxide, lithium propoxide, lithium butoxide, and a combination thereof.

10. The method according to claim 1, wherein the annealing is at a temperature of about 200-400° C.

11. The method according to claim 1, wherein the heating is at a temperature of about 160-220° C.

* * * * *